United States Patent [19]
Takagi

[11] Patent Number: 5,424,798
[45] Date of Patent: Jun. 13, 1995

[54] COLOR TEMPERATURE ADJUSTING DEVICE

[75] Inventor: Tadao Takagi, Yokohama, Japan

[73] Assignee: Nikon Corporation, Tokyo, Japan

[21] Appl. No.: 206,223

[22] Filed: Mar. 7, 1994

Related U.S. Application Data

[63] Continuation of Ser. No. 957,896, Oct. 8, 1992, abandoned.

[30] Foreign Application Priority Data

Nov. 12, 1991 [JP] Japan .................................. 3-295781

[51] Int. Cl.⁶ .............................................. G03B 15/03
[52] U.S. Cl. .................................... 354/413; 354/430
[58] Field of Search ................. 354/430, 413; 362/16, 362/18; 315/46, 50, 158, 241 P, 200 A

[56] References Cited

U.S. PATENT DOCUMENTS

| | | | |
|---|---|---|---|
| 3,989,980 | 11/1976 | Berman | 315/158 X |
| 4,685,071 | 8/1987 | Lee | 354/430 |
| 4,809,030 | 2/1989 | Takagi et al. | 354/414 |
| 4,810,937 | 3/1989 | Havel | 315/158 |
| 4,847,680 | 7/1989 | Okino | 354/430 |
| 5,016,039 | 5/1991 | Sosa et al. | 354/430 |
| 5,065,232 | 11/1991 | Kondo | 354/430 X |
| 5,109,248 | 4/1992 | Petrakos et al. | 354/430 |

*Primary Examiner*—W. B. Perkey
*Attorney, Agent, or Firm*—Shapiro and Shapiro

[57] ABSTRACT

A color temperature adjusting device for an auxiliary light source comprises a color temperature metering device for measuring a color temperature of an object field and a color temperature adjuster for adjusting a color temperature of the auxiliary light source in accordance with the color temperature measured by the color temperature metering device.

8 Claims, 9 Drawing Sheets

COLOR TEMPERATURE ADJUSTING DEVICE

This is a continuation of application Ser. No. 957,896, filed Oct. 8, 1992, now abandoned.

BACKGROUND OF THE INVENTION

1. Field of the Invention

The present invention relates to a color temperature adjusting device for an auxiliary light source which adjusts a color temperature of the auxiliary light source in accordance with a color temperature of an object field.

2. Related Background Art

An automatic daylight synchronization system of a camera which controls both a background light and a flash light in accordance with a brightness of background in order to properly balance the exposures of a principal object and the background has been known by, for example, U.S. Pat. No. 4,809,030.

However, in the prior art automatic daylight synchronization system for the camera, the balance of the color temperatures of the principal object and the background is not considered, and the balance of the color temperature may be lost depending on a photographing scene. In such a case, the resulting photograph is very unnatural.

For example, when the background is sunset glow or tungsten lamp illumination, the background appears reddish, but since a conventional auxiliary light source (for example, a flash device) has a color temperature of approximately 5500° K., a person appears whitish, which is very unnatural compared to the background.

SUMMARY OF THE INVENTION

It is an object of the present invention to provide a color temperature adjusting device for an auxiliary light source which adjusts a balance of color temperatures of a principal object and a background.

In accordance with the color temperature adjusting device for the auxiliary light source of the present invention, a color temperature of the auxiliary light source such as a flashing device is adjusted in accordance with a color temperature of an object field measured by a color temperature metering device.

In accordance with one aspect of the color temperature adjusting device for the auxiliary light source of the present invention, the color temperature of the auxiliary light source is adjusted by a color temperature adjuster toward a color temperature measured by the color temperature metering device.

In accordance with another aspect the color temperature adjusting device for the auxiliary light source of the present invention, the color temperature of the auxiliary light source is adjusted only when the color temperature measured by the color temperature metering device is lower than a predetermined temperature.

In accordance with another aspect of the color temperature adjusting device for the auxiliary light source of the present invention, an adjustment amount for the color temperature of the auxiliary light source is inputted from an external unit.

In accordance with another aspect of the color temperature adjusting device for the auxiliary light source of the present invention, the color temperature metering device and the color temperature adjuster are provided in the auxiliary light source which is separate from a camera body or in the camera body.

In accordance with still another aspect of the color temperature adjusting device for the auxiliary light source of the present invention, the color temperature of the auxiliary light source is adjusted by changing an inductance of an auxiliary light circuit.

In accordance with still another aspect the color temperature adjusting device for the auxiliary light source of the present invention, the color temperature of the auxiliary light source is adjusted by changing a color of a liquid crystal filter.

DETAILED DESCRIPTION OF THE PREFERRED EMBODIMENTS

The embodiments of the present invention are now explained in detail with reference to the drawings.

Figure 1:
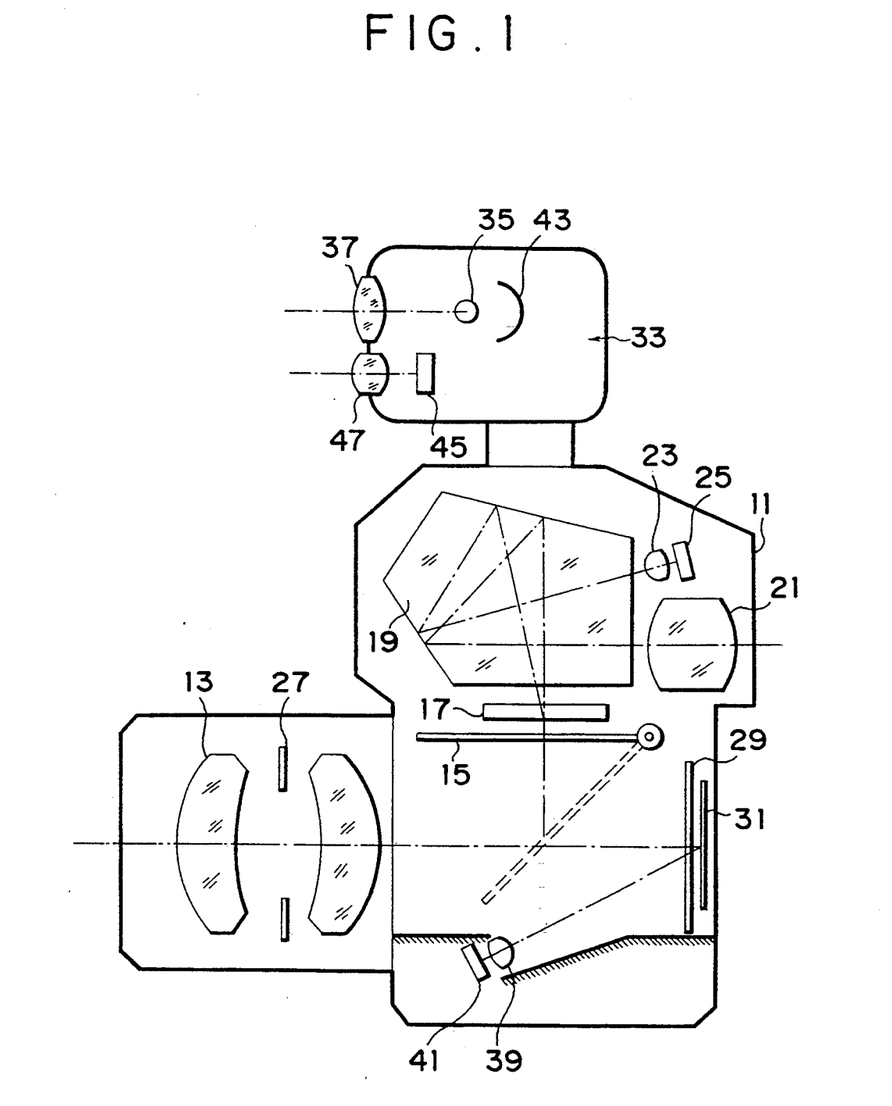
FIG. 1 shows a sectional view of a camera which embodies a first embodiment of the color temperature adjusting device for the auxiliary light source of the present invention.

FIG. 1 shows a TTL auto-exposure camera which embodies a first embodiment of the color temperature adjusting device for the auxiliary light source of the present invention.

In a view mode by a finder 11, a light beam (stationary light) passed through a photographing lens 13 is reflected by a mirror 15 which is in a down position as shown by broken lines, passes through a screen 17 and a pentaprism 19, and a portion thereof is directed to an eye lens 21 while the other portion passes through a focusing lens 23 and is directed to an exposure calculation photometering element 25.

In a photographing mode, when a shutter button (not shown) is released, the mirror 15 is driven to an up position shown by solid lines, an iris 27 is set and a shutter 29 is opened and closed. Thus, an object light passed through the photographing lens 13 is directed to a film 31 for exposure.

In an auxiliary light photographing mode, after the shutter has been opened, a xenon lamp 35 of an electronic auxiliary light source 33 which is removably mounted on the camera emits a light to illuminate the object through an illumination lens 37, and a reflected light from the object is directed to the film 31 through the photographing lens 13, and a light beam reflected by the film 31 is detected by a photometering photo-sensor 41 through a focusing lens 39.

Numeral 43 denotes a reflector and numeral 45 denotes a color temperature metering device which measures a color temperature of an object field through a focusing lens 47°

Figure 2:
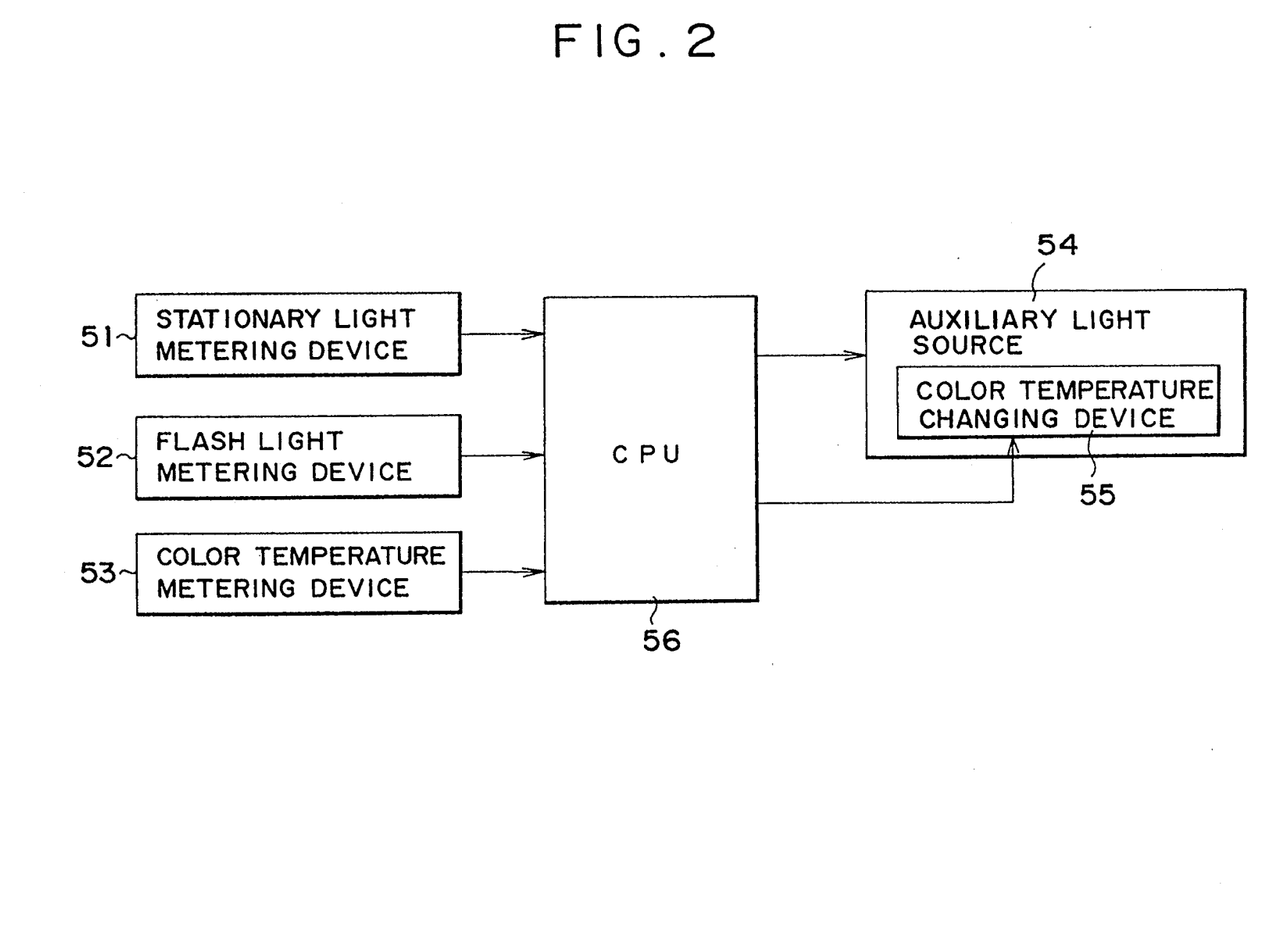
FIG. 2 shows a block diagram of the color temperature adjusting device for the auxiliary light source shown in FIG. 1.

FIG. 2 shows a block diagram of a color temperature adjusting device for the auxiliary light source of the present embodiment. Numeral 51 denotes a stationary light photometering device which comprises an focusing lens 23, an exposure calculation photometering element 25 and a photometering circuit (not shown).

Numeral 52 denotes an auxiliary light photometering device which comprises focusing lens 39, photometering photo-sensing element 41 and a photometering circuit (not shown).

Numeral 53 denotes a color temperature metering device which comprises color temperature metering device 45, focusing lens 47 and a color temperature calculation circuit (not shown).

Numeral 54 denotes an auxiliary light source which comprises electronic auxiliary light source 33.

Numeral 55 denotes a color temperature adjuster which adjusts the color temperature of the auxiliary light source in accordance with an output of the color temperature metering device 53.

Numeral 56 denotes a CPU which calculates the color temperature of the auxiliary light emitted by the auxiliary light source 54 based on the output of the color temperature metering device 53 and supplies it to the color temperature adjuster 55.

Figure 3:
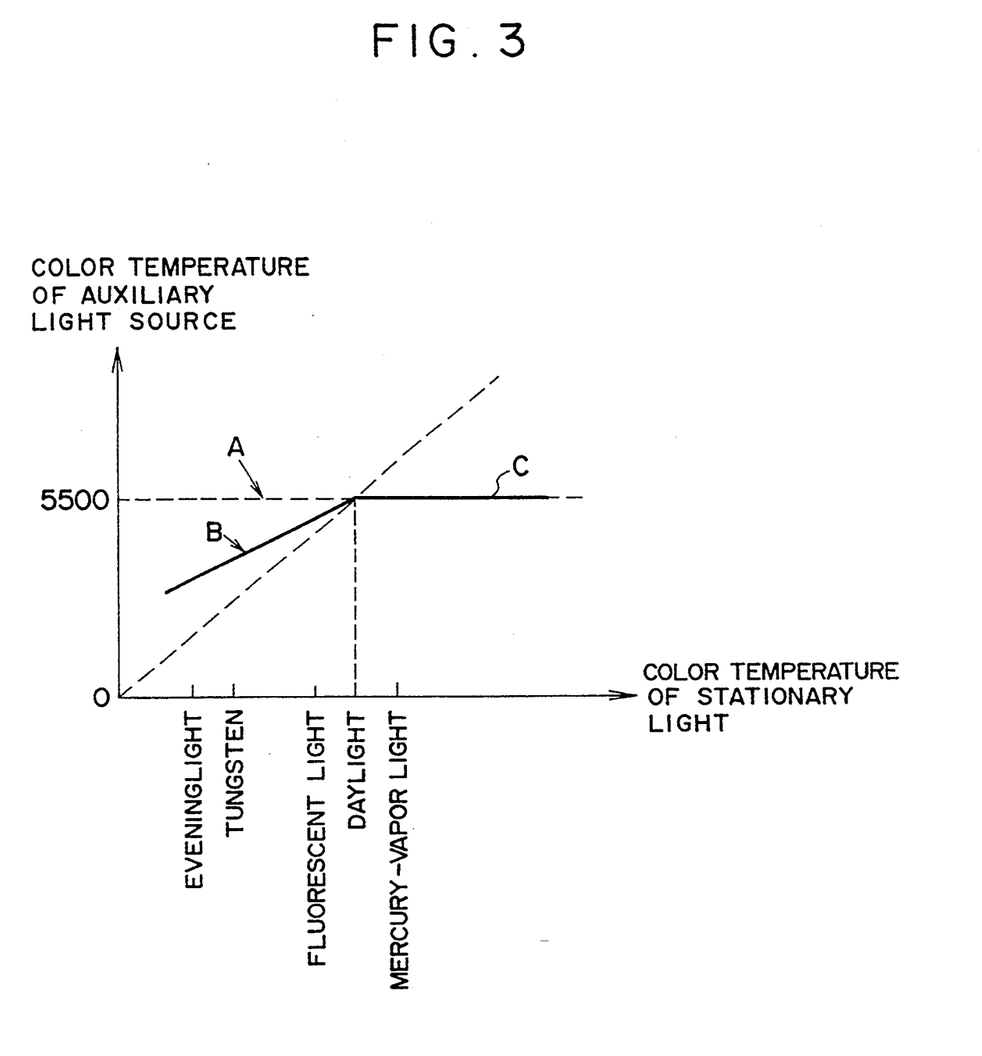
FIG. 3 illustrates the adjustment of the color temperature by the color temperature adjusting device for the auxiliary light source shown in FIG. 1.

FIG. 3 shows a relationship of the color temperature of the auxiliary light source to the color temperature of the stationary light.

The color temperature of the prior art auxiliary light source is constant, for example at 5500° K. regardless of the color temperature of the stationary light, as shown by a broken line A.

In the present embodiment, when the color temperature of the stationary light is lower than 5500° K., the color temperature of the auxiliary light source is adjusted toward the color temperature of the stationary light as shown by a solid line B.

On the other hand, when the color temperature of the stationary light is no lower-than 5500° K., the color temperature of the auxiliary light source is kept constant at 5500° K. as shown by a solid line C.

By adjusting the color temperature of the auxiliary light source toward the color temperature of the stationary light when the color temperature of the stationary light is lower than 5500° K., a person also appears reddish when the background is sunset glow or tungsten lamp illumination, and the unnatural feeling is diminished.

When the color temperature of the stationary light is no lower than 5500° K., the color temperature of the auxiliary light source is kept constant at 5500° K. so that bluish appearance of a person which is generally not accepted is prevented.

Figure 4:
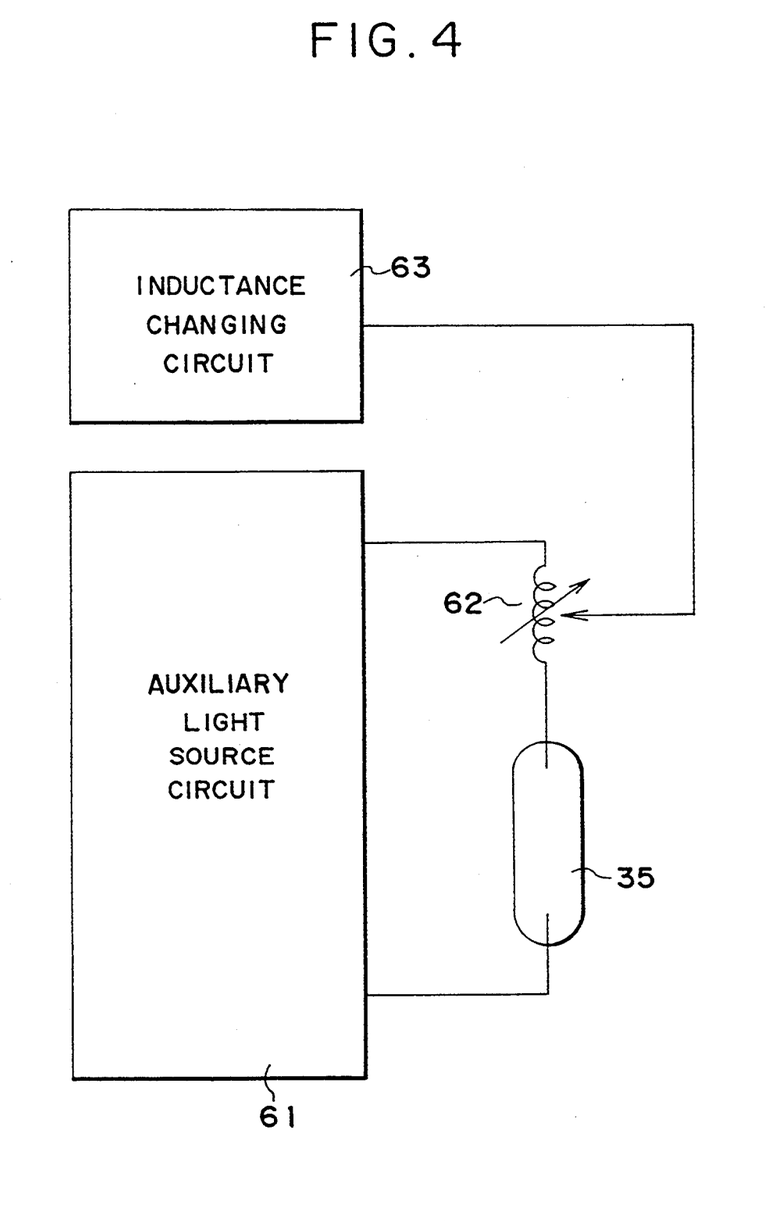
FIG. 4 shows a color temperature adjuster of the color temperature adjusting device for the auxiliary light source shown in FIG. 1.

FIG. 4 shows the color temperature adjuster 55 of the present embodiment. In the present embodiment, a variable inductance 62 is arranged between a conventional auxiliary light source circuit 61 and a xenon tube 35 and the inductance is controlled by an inductance adjusting circuit 63 in accordance with an output from the CPU 56.

In general, when a current is gradually supplied to the xenon tube 35, the rise of light emission is gentle and the color temperature is low, and when the current is supplied abruptly, the rise of the light emission is sharp and the color temperature is high. Accordingly, the color temperature may be readily adjusted by controlling the inductance.

Figure 5:
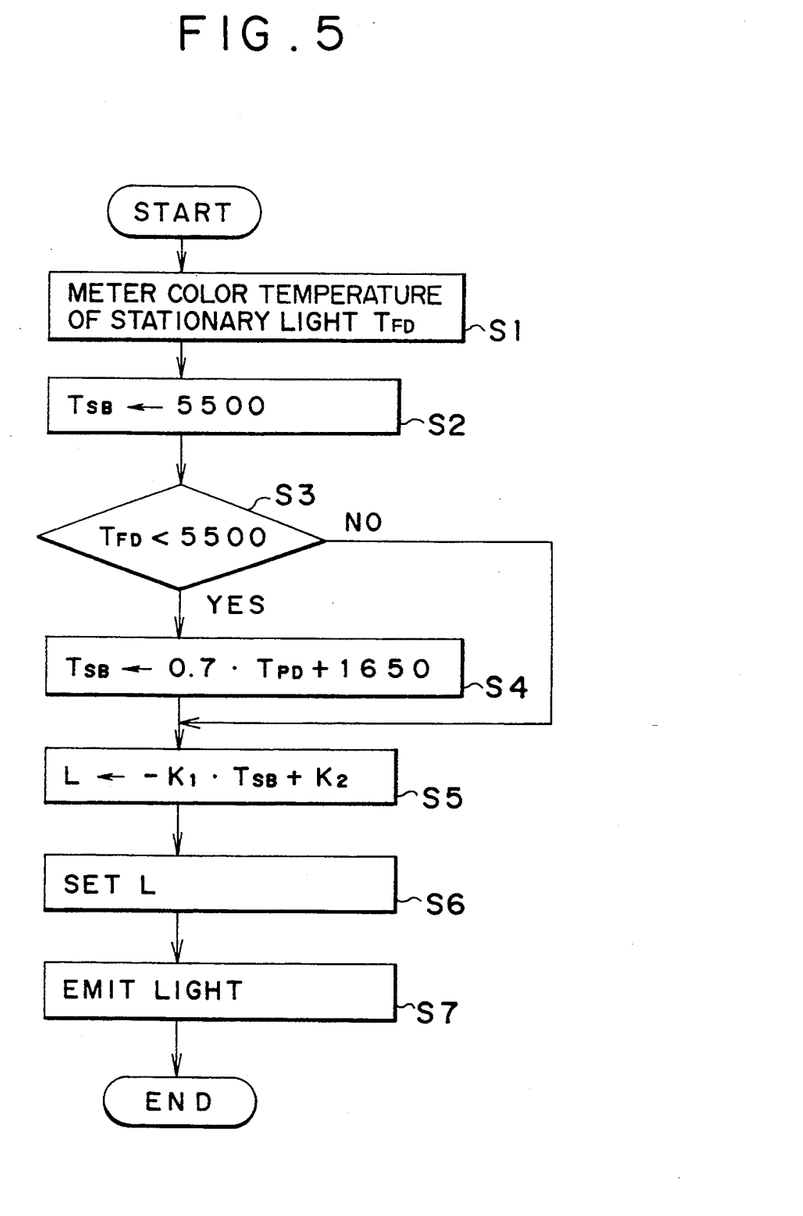
FIG. 5 shows a flow chart of the color temperature adjusting device for the auxiliary light source shown in FIG. 1.

FIG. 5 shows a flow chart of the color temperature adjusting device for the auxiliary light source of the present embodiment.

In a step S1, the color temperature $T_{FD}$ of the stationary light is measured.

In a step S2, the color temperature $T_{SB}$ of the auxiliary light source is set to 5500° K.

In a step S3, whether the color temperature $T_{FD}$ of the stationary light is lower than 5500° K. or not is determined. If it is lower, the process proceeds to a step S4, and if it is not lower, the process proceeds to a step S5.

In the step S4, the color temperature $T_{SB}$ of the auxiliary light source is set to $$T_{SB} = 0.7 \cdot T_{FD} + 1650$$

where 0.7 corresponds to a gradient of the line B in FIG. 3.

In the step S5, the inductance of the variable inductor 62 is calculated by $$L = -K1 \cdot T_{SB} + K2$$

where K1 and K2 are constants which are determined by circuit design.

In a step S6, L is set by the inductance adjusting circuit 63.

In a step S7, the light is emitted and photometered.

In the present color temperature photometering device for the auxiliary light source, the color temperature of the auxiliary light source is adjusted in accordance with the color temperature of the object field measured by the color temperature metering device 53. Accordingly, the balance of the color temperatures is well adjusted.

Further, since the color temperature of the auxiliary light source is adjusted by the color temperature adjuster 55 toward the color temperature measured by the color temperature metering device 53, the person does not appear reddish when the background is sunset glow or tungsten lamp illumination, and the unnatural feeling is diminished.

Further, since the color temperature of the auxiliary light source is adjusted only when the color temperature measured by the color temperature metering device 53 is lower than the predetermined temperature, the bluish appearance of the person which is generally not accepted is prevented.

Further, since the color temperature of the auxiliary light source is adjusted by adjusting the inductance 62 of the auxiliary light source circuit 61 of the electronic auxiliary light source 33, the color temperature can be readily and exactly adjusted.

Figure 6:
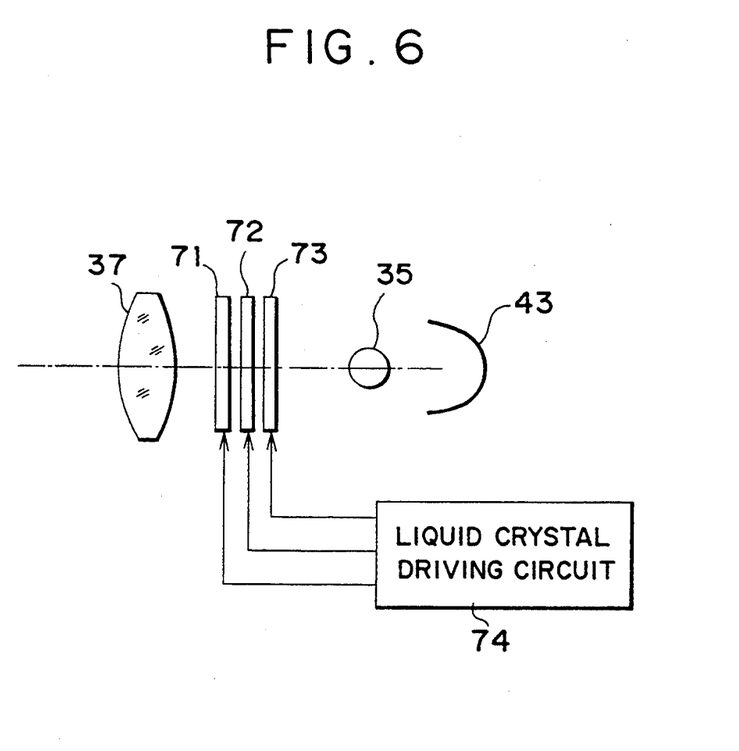
FIG. 6 shows a color temperature adjuster in a second embodiment of the color temperature adjusting device for the auxiliary light source of the present invention.

FIG. 6 shows a color temperature adjuster of a second embodiment of the color temperature adjusting device for the auxiliary light source of the present invention. In the present embodiment, color temperature adjusting filters 71, 72 and 73 are arranged in front of the xenon tube 35 to adjust the color temperature after the light emission.

The color temperature adjusting filters 71, 72 and 73 comprise guest-host type liquid crystals. The filter 71 is colored in red, the filter 72 is colored in green end the filter 73 is colored in blue when a voltage is applied from a liquid crystal driver 74.

By combining the three filters 71, 72 and 73, the color temperature of the auxiliary light emitted from the xenon tube 35 is adjusted to a desired temperature.

Figure 7:
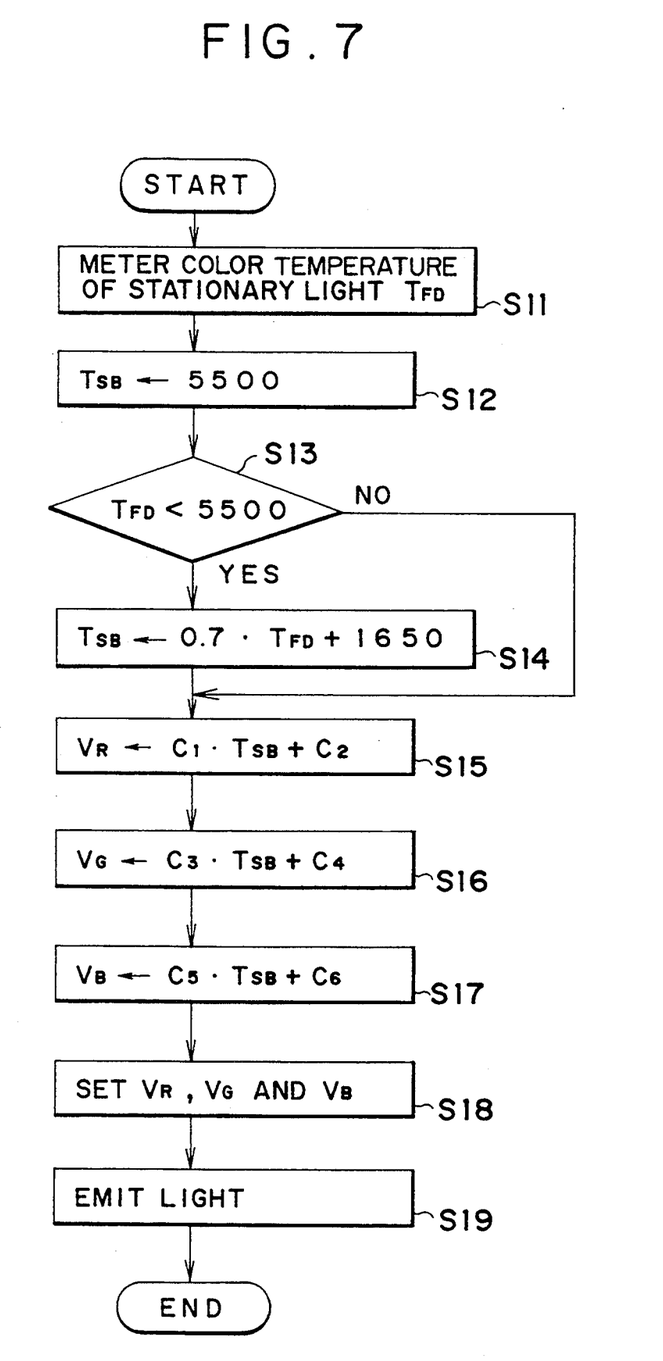
FIG. 7 shows a flow chart of the color temperature adjusting device for the auxiliary light source shown in FIG. 6.

FIG. 7 shows a flow chart of the second embodiment.

In a step S11, the color temperature $T_{FD}$ of the stationary light is measured.

In a step S12, the color temperature $T_{SB}$ of the auxiliary light source is set to 5500° K.

In a step S13, whether the color temperature $T_{FD}$ of the stationary light is lower than 5500° K. or not is determined. If it is lower, the process proceeds to a step S14, and if it is not lower, the process proceeds to a step S15.

In the step S14, the color temperature $T_{SB}$ of the auxiliary light source is set to $$T_{SB}=0.7 \cdot T_{FD}+1650$$

In the step S15, a voltage $V_R$ to be applied to the filter 71 by the liquid crystal driver 74 is calculated by $$V_R=C1 \cdot T_{SB}+C2$$

where C1 and C2 are constants which are determined by circuit design.

In a step S16, a voltage $V_G$ to be applied to the filter 72 by the liquid crystal driver 74 is calculated by $$V_G=C3 \cdot T_{SB}+C4$$

where C3 and C4 are constants which are determined by the circuit design.

In a step S17, a voltage $V_B$ to be applied to the filter 73 by the liquid crystal driver 74 is calculated by $$V_B=C5 \cdot T_{SB}+C6$$

where C5 and C6 are constants which are determined by the circuit design.

In a step S18, $V_R$, $V_G$ and $V_B$ are set by the liquid crystal driver 74.

In a step S19, the light is emitted and photometered.

The color temperature adjusting device for the auxiliary light source of the present embodiment attains the same effects as those of the first embodiment.

Figure 8:
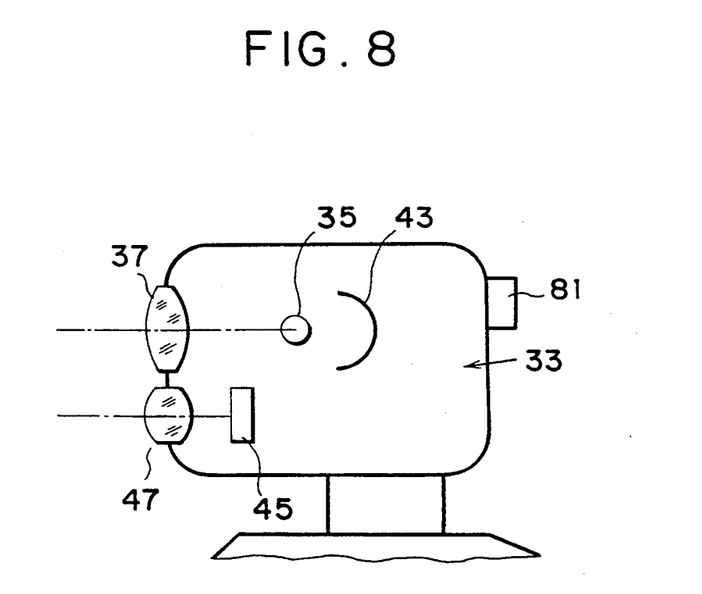
FIG. 8 shows a color temperature adjuster in a third embodiment of the color temperature adjusting device for the auxiliary light source of the present invention.

FIG. 8 shows a color temperature adjuster of a third embodiment of the color temperature adjusting device for the auxiliary light source of the present invention. In the present embodiment, a color temperature setting dial 81 for entering the color temperature of the auxiliary light source is arranged.

By manipulating the color temperature setting dial 81, H in the following formula is changed.

$$T_{SB}=H \cdot T_{FD}+1650$$

Namely, the gradient of the solid line B shown in FIG. 3 is changed.

Figure 9:
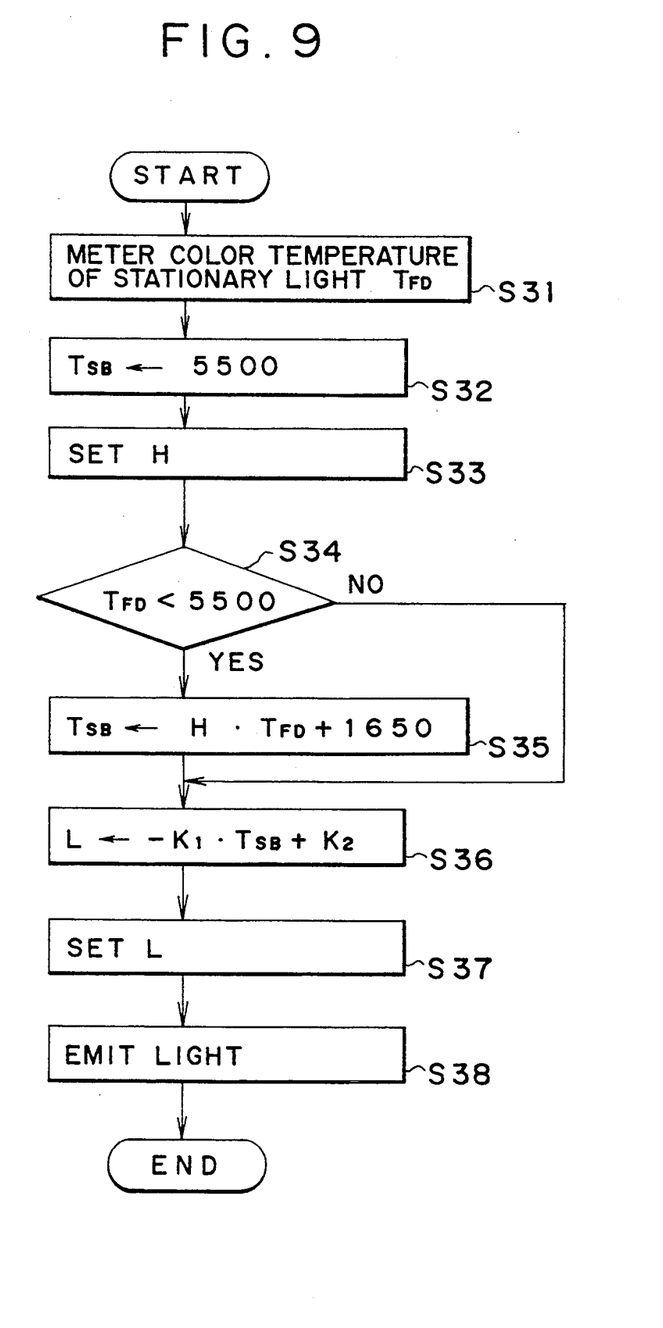
FIG. 9 shows a flow chart of the color temperature adjusting device for the auxiliary light source shown in FIG. 8.

FIG. 9 shows a flow chart of the present embodiment.

In a step S31, the color temperature $T_{FD}$ of the stationary light is measured.

In a step S32, the color temperature $T_{SB}$ of the auxiliary light source is set to 5500° K.

In a step S33, the set color temperature is entered by the color temperature setting dial 81.

In a step S34, whether the color temperature $T_{FD}$ of the stationary light is lower than 5500° K. or not is determined. If it is lower, the process proceeds to a step S35, and if it is not lower, the process proceeds to a step S36.

In the step S35, the color temperature $T_{SB}$ of the auxiliary light source is set to $$T_{SB}=H \cdot T_{FD}+1650$$

In the step S36, the inductance of the variable inductor 52 is calculated by $$L=-K1 \cdot T_{SB}+K2$$

where K1 and K2 are constants which are determined by the circuit design.

In a step S37, L is set by the inductance adjusting circuit 53.

In a step S38, the light is emitted and photometered.

The color temperature adjusting device for the auxiliary light source of the present embodiment attains substantially the same effects as those of the first embodiment. In the present embodiment, since the color temperature of the auxiliary light source can be set to any desired temperature by the color temperature setting dial 81, the balance of the color temperatures can be readily adjusted to a desired one.

In the above embodiments, the color temperature metering device is arranged on the auxiliary light source separate from the camera body although the present invention is not limited thereto and it may be arranged on the camera body. The auxiliary light source need not be a momentary light emission source but it may be a light emission source of a certain duration.

In accordance with the color temperature adjusting device for the auxiliary light source of the present invention, the color temperature of the auxiliary light source such as a flashing device is adjusted in accordance with the color temperature of the object field measured by a color temperature metering device. Accordingly, the balance of the color temperatures may be controlled as desired such as reddish or bluish.

In accordance with one aspect of the color temperature adjusting device for the auxiliary light source of the present invention, the color temperature of the auxiliary light source is adjusted by the color temperature adjuster toward the color temperature measured by the color temperature metering device. Accordingly, the reddish appearance of the person when the background is sunset glow or tungsten lamp illumination is prevented and the unnatural feeling is diminished.

In accordance with another aspect of the color temperature adjusting device for the auxiliary light source of the present invention, the color temperature of the auxiliary light source is adjusted only when the color temperature measured by the color temperature metering device is lower than the predetermined temperature. Accordingly, the bluish appearance of the person which is generally not accepted is prevented.

In accordance with another aspect of the color temperature adjusting device for the auxiliary light source of the present invention, an adjustment amount for the color temperature of the auxiliary light source is inputted from the external unit. Accordingly, the balance of the color temperatures can be adjusted as desired.

In accordance with another aspect of the color temperature adjusting device for the auxiliary light source of the present invention, the color temperature metering device and the color temperature adjuster are provided in the auxiliary light source which is separate from the camera body or in the camera body. Accordingly, the auxiliary light source is replaceable.

In accordance with still another aspect of the color temperature adjusting device for the auxiliary light source of the present invention, the color temperature of the auxiliary light source is adjusted by changing the inductance of the auxiliary light circuit. Accordingly, the color temperature can be readily and exactly adjusted.

In accordance with still another aspect of the color temperature adjusting device for the auxiliary light source of the present invention, the color temperature of the auxiliary light source is adjusted by changing the color of the liquid crystal filter. Accordingly, the color temperature can be readily and exactly adjusted.

What is claimed is:

1. A color temperature adjusting device for an auxiliary light source, comprising:
    color temperature metering means for measuring a color temperature of an object field; and
    color temperature adjusting means for adjusting a color temperature of said auxiliary light source toward the color temperature measured by said color temperature metering means only when the color temperature measured by said color temperature metering means is lower than a predetermined temperature.

2. A color temperature adjusting device for an auxiliary light source, comprising:
    a color temperature metering device which measures a color temperature of an object field; and
    color temperature adjusting circuitry which adjusts a color temperature of said auxiliary light source toward the color temperature measured by said color temperature metering device, wherein said color temperature adjusting circuitry has a color temperature setting component for manual inputting of a desired color temperature by a user and adjusts the color temperature of said auxiliary light source toward the color temperature input by said color temperature setting component.

3. A color temperature adjusting device for an auxiliary light source, comprising:
    a color temperature metering device which measures a color temperature of an object field; and
    color temperature adjusting circuitry which adjusts a color temperature of said auxiliary light source toward the color temperature measured by said color temperature metering device, wherein said color temperature metering device and said color temperature adjusting circuitry are provided with said auxiliary light source in a unit attachable to and detachable from a camera.

4. A color temperature adjusting device for an auxiliary light source, comprising:
    a color temperature metering device which measures a color temperature of an object field; and
    color temperature adjusting circuitry which adjusts a color temperature of said auxiliary light source toward the color temperature measured by said color temperature metering device, wherein said color temperature adjusting circuitry adjusts the color temperature of said auxiliary light source by adjusting an inductance in a circuit of said auxiliary light source.

5. A color temperature adjusting device for an auxiliary light source, comprising:
    a color temperature metering device which measures a color temperature of an object field; and
    color temperature adjusting circuitry which adjusts a color temperature of said auxiliary light source toward the color temperature measured by said color temperature metering device, wherein said color temperature adjusting circuitry has a first adjustable-transmittance liquid crystal filter having a first hue and a second adjustable-transmittance liquid crystal filter having a second hue and adjusts the color temperature of said auxiliary light source by applying voltage to said first and second liquid crystal filters.

6. A device according to claim 5, wherein said first and second liquid crystal filters have a common optical axis.

7. A device according to claim 5, wherein said first and second liquid crystal filters are arranged in series in a path of light emitted by said auxiliary light source.

8. A color temperature adjusting device for an auxiliary light source, comprising:
    a color temperature metering device which measures a color temperature of an object; and
    color temperature adjusting circuitry which adjusts a color temperature of said auxiliary light source based on the color temperature measured by said color temperature metering device, wherein said color temperature adjusting circuitry includes an adjustable-transmittance liquid crystal filter having a hue and disposed in a path of said auxiliary light.

* * * * *